United States Patent
Kim et al.

(10) Patent No.: US 7,507,470 B2
(45) Date of Patent: *Mar. 24, 2009

(54) DIFFUSION SHEET FOR TFT-LCD

(75) Inventors: Sang Pil Kim, Gumi (KR); Mun Bok Lee, Chucheon-si (KR)

(73) Assignee: Toray Saehan, Inc. (KR)

( * ) Notice: Subject to any disclaimer, the term of this patent is extended or adjusted under 35 U.S.C. 154(b) by 189 days.

This patent is subject to a terminal disclaimer.

(21) Appl. No.: 11/550,916

(22) Filed: Oct. 19, 2006

(65) Prior Publication Data

US 2007/0128444 A1     Jun. 7, 2007

(30) Foreign Application Priority Data

Oct. 21, 2005     (KR) .................. 10-2005-0099682

(51) Int. Cl.
- *B32B 7/02*     (2006.01)
- *B32B 5/16*     (2006.01)
- *G02B 5/02*     (2006.01)
- *G02B 13/20*    (2006.01)

(52) U.S. Cl. .................. 428/323; 428/212; 428/327; 359/599; 359/707

(58) Field of Classification Search .............. None
See application file for complete search history.

(56) References Cited

U.S. PATENT DOCUMENTS 7,379,246 B2 *   5/2008   Kim et al. .................. 359/599

FOREIGN PATENT DOCUMENTS

| KR | 10-046609 | 1/2005 |
|----|-----------|--------|
| WO | 03/085424 | 3/2003 |

* cited by examiner

*Primary Examiner*—Sheeba Ahmed
(74) *Attorney, Agent, or Firm*—Bell, Boyd & Lloyd LLP

(57) ABSTRACT

Disclosed herein is a diffusion sheet for use in a backlight unit of a TFT-LCD. Specifically, this invention provides a diffusion sheet including a transparent base sheet, a light-diffusing layer laminated on one surface of the base sheet, and an antiblocking layer laminated on the other surface of the base sheet, the base sheet satisfying a refractive index represented by a predetermined equation. According to this invention, the diffusion sheet for a display can uniformly diffuse light, which is radiated from a light source lamp positioned at a side surface or the back surface of the display, while passing such light therethrough, thus obtaining clear display images, resulting in increased total light transmittance, light diffusibility, and luminance.

13 Claims, 1 Drawing Sheet

[FIG 2]

DIFFUSION SHEET FOR TFT-LCD

BACKGROUND

The present invention relates, generally, to a diffusion sheet for use in a backlight unit of a TFT-LCD (Thin Film Transistor-Liquid Crystal Display), and, more particularly, to a diffusion sheet for a display, which can uniformly diffuse light, which is radiated from a light source lamp positioned at a side surface or the back surface of the display, while passing such light therethrough, to thus obtain clear display images.

Recently, LCDs are variously used not only as monitors for notebook computers but also as large monitors for desktop computers and monitors for television sets. Accordingly, the need for screens to be large and the luminance to be high of backlight units, serving as the light source of LCDs, is increasing. In the backlight unit, a diffusion sheet functions to diffuse light from the light source at the side surface or back surface of the display to the entire screen and to uniformly transfer such light forward by means of refraction. The backlighting process is an indirect lighting process for enhancing the brightness of a display screen in a manner such that light originating from the light source of a backlight unit, mounted to the back surface of a display, is transferred to the opposite side through a light guide plate and then reflected at a reflective plate, such as a metal deposition plate or an opaque white plate, to radiate the light forward. Thereby, the backlighting process is a light emission technique that is able to overcome the problems with the conventional front-lighting process. In the backlighting process, when the number of light sources of a backlight unit is increased in order to realize high image brightness, power consumption and heat generation rates are increased. However, since maximum light efficiency should be realized using minimum power consumption, typical techniques of manufacturing a light-diffusion sheet comprising a base sheet and a light-diffusing layer formed on at least one surface of the base sheet in order to transfer light from a light source to a liquid crystal operator have been proposed. As such, in the light-diffusion sheet, it is important to realize an efficient design for the light-diffusing layer formed on the base sheet and to improve the functions thereof through such a design.

In this regard, Japanese Patent Application No. 2002-104820 discloses a light-diffusing layer which is formed of a resin film having fine roughness on at least one surface of a transparent film. As such, this patent is characterized in that the transparent film contains a thermoplastic resin having a substituted and/or unsubstituted imido group on a side chain thereof and a thermoplastic resin having a substituted and/or unsubstituted phenyl group and a nitrile group on a side chain thereof. In addition, Korean Patent Application No. 1996-38912 discloses a method of forming a layer of a transparent resin and organic particles on a transparent plastic sheet to increase light efficiency and luminance. However, such conventional techniques suffer because they are difficult to use to actually realize high luminance and shielding of LCDs, that is, improved total light transmittance and light diffusibility, merely by varying the combination of resin and particles applicable in the light-diffusing layer.

SUMMARY

Therefore, the present invention has been made keeping in mind the above problems occurring in the prior art, and an object of the present invention is to provide a diffusion sheet for a TFT-LCD, which has increased light transmittance and light diffusibility.

In order to accomplish the above object, the present invention provides a diffusion sheet, comprising a transparent base sheet, a light-diffusing layer laminated on one surface of the base sheet, and an antiblocking layer laminated on the other surface of the base sheet, in which the base sheet satisfies Equation 1 below:

$$SR=|(N_{max}-N_z)/(N_{td}-N_{md})|>20$$

$$N_z \leq 1.494 \quad \text{Equation 1}$$

wherein SR is the three dimensional refraction constant of the base sheet, $N_{max}$ is the greater value of either the refractive index of the sheet in a machinery direction (MD) or the refractive index of the sheet in a transverse direction (TD), $N_z$ is the refractive index of the sheet in a thickness direction, $N_{td}$ is the refractive index of the sheet in the TD, and $N_{md}$ is the refractive index of the sheet in the MD.

In the diffusion sheet, the light-diffusing layer may comprise a resin and diffusion particles.

As such, the resin may be a thermosetting resin, and the diffusion particles may comprise at least one resin selected from the group consisting of acryl, polyurethane, polyvinyl chloride, polystyrene, polyacrylonitrile, polyamide, and polymethylmethacrylate, with a diameter of 0.1~100 μm. Further, the light-diffusing layer may comprise 100 parts by weight of the resin and 0.1~1000 parts by weight of the diffusion particles, and may be 0.2~500 μm thick.

In addition, the antiblocking layer may comprise an antiblocking resin and antiblocking particles, the antiblocking resin being a thermosetting resin. The antiblocking particles may comprise at least one resin selected from the group consisting of acryl, polyurethane, polyvinyl chloride, polystyrene, polyacrylonitrile, polyamide, and polymethylmethacrylate, with a diameter of 0.1~100 μm. Such an antiblocking layer may comprise 100 parts by weight of the resin and 0.01~500 parts by weight of the antiblocking particles, and may be 0.1~100 μm thick.

Additional features and advantages are described herein, and will be apparent from, the following Detailed Description and the figures.

BRIEF DESCRIPTION OF THE FIGURES

FIG. 2 is a schematic view showing the refractive indexes of the base sheet in predetermined directions.

DETAILED DESCRIPTION

Figure 1:
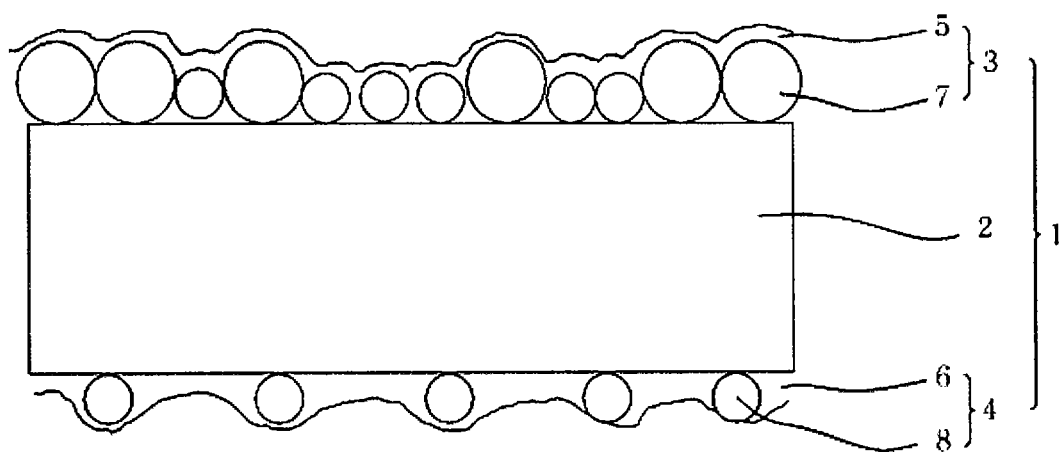
FIG. 1 is a cross-sectional view schematically showing a light-diffusion sheet having voids, according to the present invention.
Figure 1:
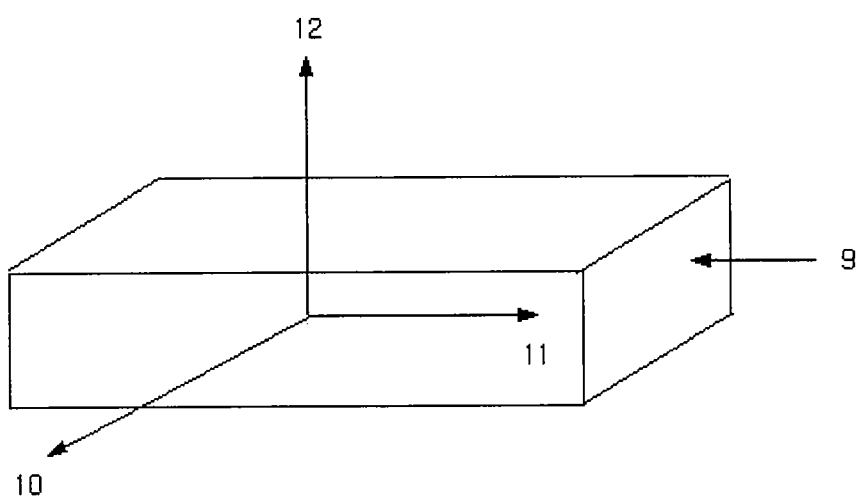

Hereinafter, a detailed description will be given of the present invention.

In the present invention, the diffusion sheet 1 comprises a transparent base sheet 2, a light-diffusing layer 3 laminated on one surface of the base sheet, and an antiblocking layer 4 laminated on the other surface of the base sheet, the base sheet satisfying Equation 1 below.

Although the thickness of the base sheet 2 is not particularly limited, it is preferably 10~500 μm, and more preferably 75~250 μm. As such, if the thickness of the base sheet 2 is less than 10 μm, a curling phenomenon may be readily caused by the resin composition constituting the light-diffusing layer 3. On the other hand, if the thickness of the base sheet 2 exceeds 500 μm, the luminance of the LCD is decreased and the backlight unit becomes so thick as to be unsuitable for use in manufacturing a slim LCD. In this way, on one surface of the light-diffusion sheet 1, the light-diffusing layer 3 composed of a light-diffusing resin 5 and light-diffusing particles 7 is provided.

The main characteristic of the present invention is that the relationship between refractive indexes of the base sheet in three directions is set within a predetermined range in order to maximize the transmittance of light passing through the base sheet so as to enhance the luminance of the diffusion sheet. At this time, for maximum total light transmittance and high luminance of light passing through the base sheet, the relationship between the refractive indexes of the base sheet in three directions should satisfy Equation 1 below:

$$SR=|(N_{max}-N_z)/(N_{td}-N_{md})|>20$$

$$N_z \leq 1.494 \qquad \text{Equation 1}$$

wherein SR is the three dimensional refraction constant of the base sheet, $N_{max}$ is the greater value of either the refractive index of the sheet in the MD or the refractive index of the sheet in the TD, $N_z$ is the refractive index of the sheet in the thickness direction, $N_{td}$ is the refractive index of the sheet in the TD, and $N_{md}$ is the refractive index of the sheet in the MD.

When the Sr is not more than 20, the improvement of total light transmittance and luminance becomes insignificant. Further, in the case where $N_z$ exceeds 1.494, it is difficult to achieve an increase in the transmittance and luminance of the diffusion sheet, undesirably decreasing the luminance properties of the LCD.

Further, the light-diffusing layer 3 includes a light-diffusing resin 5 and light-diffusing particles 7 dispersed in the resin. Any resin may be used as the light-diffusing resin 5 as long as it is curable, and preferably, a thermosetting resin which is easily handled and available is useful. Examples of the thermosetting resin include, but are not limited to, any one selected from the group consisting of urea resin, melamine resin, phenol resin, epoxy resin, unsaturated polyester resin, alkyd resin, urethane resin, acrylic resin, polyurethane, fluorine resin, silicon resin, and polyamideimide. Moreover, the resin should be preferably colorless and transparent, since light should be transmitted therethrough. In addition to the above light-diffusing resin, a plasticizer, a stabilizer, a deterioration preventing agent, a dispersant, an antifoaming agent, or a foaming agent may be further included, if necessary.

The light-diffusing particles 7 used in the light-diffusing layer 3 comprise at least one selected from the group consisting of acrylic resin, polyurethane, polyvinyl chloride, polystyrene, polyacrylonitrile, polyamide, and polymethylmethacrylate, and are preferably in a spherical form. More preferably, the light-diffusing particles should be colorless and transparent so as to maximize the amount of light passing through the light-diffusion sheet.

The light-diffusing particles have a diameter of 0.1~100 µm, preferably 0.1~50 µm, and more preferably 0.1~10 µm. If the diameter is less than 0.1 µm, the light-diffusing effect becomes insignificant. On the other hand, if the diameter exceeds 100 µm, the resin composition constituting the light-diffusing layer is difficult to apply and the particles may become detached from the laminated light-diffusing layer.

In order to manufacture a light-diffusion sheet having total light transmittance of 85~95% by controlling the optical properties of the light-diffusing layer 3, the ratio of light-diffusing resin 5 and light-diffusing particles 7 is adjusted.

That is, the light-diffusing layer 3 is formed such that the light-diffusing particles 7 are used in an amount of 0.1~1000 parts by weight, and preferably 10~500 parts by weight, based on 100 parts by weight of the light-diffusing resin 5. If the amount of light-diffusing particles 7 is less than 0.1 parts by weight, the light-diffusing effect is reduced. On the other hand, if the amount exceeds 1000 parts by weight, the light-diffusing resin composition constituting the light-diffusing layer is difficult to apply.

In the light-diffusion sheet 1 of the present invention, the thickness of the light-diffusing layer 3 is adjusted, thereby controlling the light transmittance. In particular, with the intention of manufacturing a light-diffusion sheet having total light transmittance of 85~95%, the light-diffusing layer 3 is applied to a thickness of 0.2~500 µm, and preferably 2~200 µm. If the light-diffusing layer is applied to a thickness less than 0.2 µm, it has low adhesion to the sheet when applied, and the light-diffusing particles may become detached from the laminated light-diffusing layer. On the other hand, if the applied layer is thicker than 500 µm, total light transmittance is not higher than 84%, and thus a desired light-diffusion sheet cannot be manufactured.

Also, the light-diffusion sheet 1 of the present invention has an antiblocking layer 4 composed of an antiblocking resin 6 and antiblocking particles 8.

The antiblocking resin 6 usable in the antiblocking layer 4 preferably includes the same thermosetting resin as the light-diffusing resin 5, which is exemplified by any one selected from the group consisting of urea resin, melamine resin, phenol resin, epoxy resin, unsaturated polyester resin, alkyd resin, urethane resin, acrylic resin, polyurethane, fluorine resin, silicon resin, and polyamideimide. The antiblocking resin 6 should be colorless and transparent, since light must be transmitted therethrough.

In addition, a plasticizer, a stabilizer, a deterioration preventing agent, a dispersant, an antifoaming agent, a foaming agent or a waxing agent may be further used.

Further, the antiblocking particles 8 used in the antiblocking layer 4, which are the same as the light-diffusing particles 7, include any one selected from the group consisting of acrylic resin, polyurethane, polyvinyl chloride, polystyrene, polyacrylonitrile, polyamide, and polymethylmethacrylate. The antiblocking particles are preferably spherical. As well, the antiblocking particles 8 should be preferably colorless and transparent in order to maximize the amount of light passing through the light-diffusion sheet. The particles 8 have a diameter of 0.1~100 µm, and preferably 1~50 µm. If the diameter of antiblocking particles 8 is smaller than 0.1 µm, a blocking phenomenon, which impedes movement of a film, may occur during a manufacturing process. On the other hand, if the diameter of antiblocking particles exceeds 100 µm, the resin composition constituting the antiblocking layer is difficult to apply, and the antiblocking particles may become detached from the laminated antiblocking layer.

The antiblocking layer 4 is formed such that the antiblocking particles 8 are used in an amount of 0.01~500 parts by weight, and preferably 0.1~100 parts by weight, based on 100 parts by weight of the antiblocking resin 6. If the amount of antiblocking particles 8 is less than 0.01 parts by weight, a blocking phenomenon, which impedes movement of a film, may occur during a manufacturing process. On the other hand, if the above amount exceeds 500 parts by weight, it is difficult to apply the resin composition constituting the antiblocking layer 4.

Further, to assure high light transmittance and antiblocking function and to obtain total light transmittance of 85~95%, the antiblocking layer 4 is applied to a thickness of 0.1~100

μm, preferably 0.1~50 μm, and more preferably 0.1~20 μm. If the antiblocking layer 4 is applied to a thickness less than 0.1 μm, it has low adhesion to the base sheet upon application, and the antiblocking particles may become detached from the laminated antiblocking layer. On the other hand, if the antiblocking layer 4 is thicker than 100 μm, total light transmittance is decreased to 84% or less, and therefore it is impossible to manufacture a desired light-diffusion sheet.

A better understanding of the present invention may be obtained in light of the following examples, which are set forth to illustrate, but are not to be construed to limit the present invention.

EXAMPLE 1

Manufacture of Light-Diffusion Sheet 1

Step 1: Formation of Base Sheet

A polyester resin was dried in a vacuum, melted, and extruded using an extruder, after which the melted hot polyester resin was formed into a sheet using a rotary cooling roll via a die. As such, the polymer was brought into close contact with the cooling roll using an electrostatic application process, thereby obtaining an undrawn polyester sheet. While the undrawn polyester sheet was passed on a roll preheated to 70~120° C., it was drawn three times in MD, thus obtaining a uniaxially drawn polyester film. Both edges of the uniaxially drawn polyester film were held with clips, and then this film was fed into a chamber heated to 80~150° C. such that heat was applied to the top side and underside of the film using hot air to draw the film five times in the TD. Subsequently, the film was fed into a higher temperature chamber to thermoset it at 220° C. for crystal orientation.

Step 2: Formation of Light-Diffusing Layer

A light-diffusing layer composition comprising the components shown in Table 1 below was applied on one surface of a highly transparent polyester film (XG533-100 um, available from Toray Saehan Inc.) as the base sheet formed in step 1 and was then dried at 110° C. for 60 sec, thus forming a light-diffusing layer 30 μm thick.

TABLE 1

| Total Weight of Composition | | | 100 g |
|---|---|---|---|
| Composition | Light-diffusing Resin | Acrylic Resin (A-811, Aekyung Chemical Co. Ltd.) | 30 g |
| | Light-diffusing Particles | Acrylic Particles (SOKEN MX1000) | 30 g |
| | Solvent | Methylethylketone | 40 g |

Step 3: Formation of Antiblocking Layer

An antiblocking layer composition comprising the components shown in Table 2 below was applied on a surface of the base sheet opposite the surface having the light-diffusing layer formed in step 2, and was then dried at 110° C. for 40 sec, thus forming an antiblocking layer 5 μm thick, thereby manufacturing a final light-diffusion sheet.

TABLE 2

| Total Weight of Composition | | | 100 g |
|---|---|---|---|
| Composition | Antiblocking Resin | Acrylic Resin (A-811, Aekyung Chemical Co. Ltd.) | 28 g |
| | Antiblocking Particles | Acrylic Particles (SOKEN MX300) | 0.5 g |
| | Solvent | Methylethylketone | 70 g |
| | Antistatic Agent | Anionic Antistatic Agent (CHEMISTAT) | 1.5 g |

EXAMPLE 2

Manufacture of Light-Diffusion Sheet 2

A diffusion sheet was manufactured in the same manner as in Example 1, with the exception that the draw ratio/draw temperature were changed to 3.5 times/105° C. in the MD and 4.3 times/120° C. in the TD.

EXAMPLE 3

Manufacture of Light-Diffusion Sheet 3

A diffusion sheet was manufactured in the same manner as in Example 1, with the exception that the draw ratio/draw temperature were changed to 3.7 times/107° C. in the MD and 4.6 times/123° C. in the TD.

COMPARATIVE EXAMPLE 1

A diffusion sheet was manufactured in the same manner as in Example 1, with the exception that the draw ratio/draw temperature were changed to 3.2 times/100° C. in the MD and 5.0 times/120° C. in the TD.

COMPARATIVE EXAMPLE 2

A diffusion sheet was manufactured in the same manner as in Example 1, with the exception that the draw ratio/draw temperature were changed to 2.8 times/100° C. in the MD and 4.5 times/120° C. in the TD.

COMPARATIVE EXAMPLE 3

A diffusion sheet was manufactured in the same manner as in Example 1, with the exception that the draw ratio/draw temperature were changed to 2.5 times/100° C. in the MD and 3.2 times/120° C. in the TD.

EXPERIMENTAL EXAMPLE

The properties of the diffusion sheets manufactured in Examples 1~3 and Comparative Examples 1~3 were measured as follows. The results are shown in Table 3 below.

1. Measurement of Refractive Index

The sample was cut to a size of 10 mm×30 mm, and was then measured with respect to the refractive indexes in respective directions (MD, TD, and thickness) using an ABBE refractor under predetermined temperature conditions (20±0.1° C.) using methyl iodide (refractive index of 1.74). In this case, measurement was performed according to ASTM-D542.

2. Measurement of Total Light Transmittance

The light transmittance and light diffusibility of the diffusion sheet were determined according to the following procedures. While light of 550 nm was transmitted perpendicular to a 10 cm×10 cm sized light-diffusion sheet sample which had been stood upright, the amount of transmitted light was measured using an automatic digital hazemeter, available from Nippon Denshoku Industries Co., Ltd. The haze and the total light transmittance were calculated from Equation 2 below:

$$Haze(\%)=(1-P/TT)*100$$

$$Total\ Light\ Transmittance(\%)=(TT/IT)*100 \quad \text{Equation 2}$$

wherein P is the amount of straight light, TT is the total amount of transmitted light, and IT is the amount of incident light.

3. Measurement of Light Diffusibility

The light diffusibility of the light-diffusion sheet manufactured in Example 1 was measured according to the following procedures. A light-diffusion sheet sample was cut and then mounted on a light-diffusing plate of a 32" direct type backlight unit. Then, a BM-7, which is a luminance meter available from Topcon Corporation, was provided such that the measurement angle was set to 0.2° and the interval between the backlight unit and the BM-7 was set to 25 cm, after which luminance was measured at 13 positions of lamps of the backlight unit and 12 positions between the lamps. Then, the average luminance at the positions of the lamps and the average luminance between the lamps were determined and the difference therebetween was taken as light diffusibility. Subsequently, the difference in average luminance (average luminance at the lamps—average luminance between the lamps) was classified according to the following criteria, to evaluate light diffusibility:

Δ(difference in average luminance)<1:good
Δ(difference in average luminance)≧1:poor
The results are given in Table 3 below.

TABLE 3

| | Base Sheet | | | | | Diffusion Sheet | | | | |
|---|---|---|---|---|---|---|---|---|---|---|
| | Manufacturing Process | | | | | Total Light Trans mit. (%) | Light-Diff. Δ (cd/m²) (Differ. In Average Lum.) | | Lum. | |
| Ex. No. | Draw Ratio (MD × TD) | Draw Temp. (MD/TD) | $N_{md}$ | $N_{td}$ | $N_z$ | SR | | | Class. | cd/m² | Result |
| 1 | 3.3 × 4.3 | 100/120 | 1.662 | 1.664 | 1.491 | 86.5 | 92 | 0.7 | Good | 6950 | Good |
| 2 | 3.5 × 4.3 | 105/120 | 1.664 | 1.663 | 1.492 | 171 | 94 | 0.5 | Good | 6985 | Good |
| 3 | 3.7 × 4.6 | 107/123 | 1.665 | 1.663 | 1.490 | 86.5 | 94 | 0.5 | Good | 7020 | Good |
| C.1 | 3.2 × 5.0 | 100/120 | 1.648 | 1.673 | 1.496 | 7.08 | 88 | 0.2 | Good | 6530 | Poor |
| C.2 | 2.8 × 4.5 | 100/120 | 1.645 | 1.672 | 1.497 | 6.48 | 88 | 0.4 | Good | 6450 | Poor |
| C.3 | 2.5 × 3.2 | 100/120 | 1.642 | 1.651 | 1.498 | 17 | 87 | 0.5 | Good | 6320 | Poor |

As is apparent from Table 3, both the total light transmittance and the light diffusibility of the diffusion sheets of Examples 1~3, satisfying Equation 1, were superior to those of Comparative Examples 1~3, not satisfying Equation 1.

As described hereinbefore, the present invention provides a diffusion sheet for a TFT-LCD. According to the present invention, the sheet, having a controllable refractive index and satisfying a predetermined equation provided in the present invention, is excellent with respect to total light transmittance, light diffusibility, and luminance. Therefore, the diffusion sheet of the present invention can be used as an optical material for improving the light efficiency of a backlight unit of a TFT-LCD, and is thus considered very useful in the chemical industry field.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A diffusion sheet, comprising a transparent base sheet, a light-diffusing layer laminated on one surface of the base sheet, and an antiblocking layer laminated on the other surface of the base sheet;
wherein the base sheet satisfies Equation 1 below:

$$SR=|(N_{max}-N_z)/(N_{td}-N_{md})|>20$$

$N_z \leq 1.494$   Equation 1 wherein SR is a three dimensional refraction constant of the base sheet, $N_{max}$ is a value greater than either a refractive index of the sheet in a machinery direction or a refractive index of the sheet in a transverse direction, $N_z$ is a refractive index of the sheet in a thickness direction, $N_{td}$ is a refractive index of the sheet in a transverse direction, and $N_{md}$ is a refractive index of the sheet in a machinery direction.

2. The diffusion sheet as set forth in claim 1, wherein the light-diffusing layer comprises a resin and diffusion particles.

3. The diffusion sheet as set forth in claim 2, wherein the resin is a thermosetting resin.

4. The diffusion sheet as set forth in claim 2, wherein the diffusion particles comprise at least one resin selected from the group consisting of acryl, polyurethane, polyvinyl chloride, polystyrene, polyacrylonitrile, polyamide, and polymethylmethacrylate.

5. The diffusion sheet as set forth in claim 2, wherein the diffusion particles have a diameter of 0.1 to about 100 μm.

6. The diffusion sheet as set forth in claim 2, wherein the light-diffusing layer comprises 100 parts by weight of the resin and 0.1 to about 1000 parts by weight of the diffusion particles.

7. The diffusion sheet as set forth in claim 1, wherein the light-diffusing layer is 0.2 to about 500 μm thick.

8. The diffusion sheet as set forth in claim 1, wherein the antiblocking layer comprises an antiblocking resin and antiblocking particles.

9. The diffusion sheet as set forth in claim 8, wherein the antiblocking resin is a thermosetting resin.

10. The diffusion sheet as set forth in claim 8, wherein the antiblocking particles comprise at least one resin selected from the group consisting of acryl, polyurethane, polyvinyl chloride, polystyrene, polyacrylonitrile, polyamide, and polymethylmethacrylate.

11. The diffusion sheet as set forth in claim 8, wherein the antiblocking particles have a diameter of 0.1 to about 100 μm.

12. The diffusion sheet as set forth in claim 8, wherein the antiblocking layer comprises 100 parts by weight of the resin and 0.01 to about 500 parts by weight of the antiblocking particles.

13. The diffusion sheet as set forth in claim 1, wherein the antiblocking layer is 0.1 to about 100 μm thick.

* * * * *